United States Patent
Harada et al.

(10) Patent No.: US 10,050,569 B2
(45) Date of Patent: Aug. 14, 2018

(54) INVERTER CONTROL DEVICE AND INVERTER CONTROL METHOD

(71) Applicant: Mitsubishi Electric Corporation, Tokyo (JP)

(72) Inventors: Shingo Harada, Tokyo (JP); Keiichi Enoki, Tokyo (JP); Yasukazu Murata, Hyogo (JP); Masutaka Watanabe, Tokyo (JP); Yoshimasa Nishijima, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/432,420

(22) Filed: Feb. 14, 2017

(65) Prior Publication Data

US 2017/0279383 A1 Sep. 28, 2017

(30) Foreign Application Priority Data

Mar. 25, 2016 (JP) ................................ 2016-061240

(51) Int. Cl.
*H02P 6/04* (2016.01)
*H02M 7/48* (2007.01)
(Continued)

(52) U.S. Cl.
CPC ................. *H02P 6/04* (2013.01); *H02P 5/00* (2013.01); *H02P 27/08* (2013.01)

(58) Field of Classification Search
USPC ...................................................... 318/34, 41
See application file for complete search history.

(56) References Cited

U.S. PATENT DOCUMENTS 5,646,510 A * 7/1997 Kumar .................. B60L 3/0023
290/40 B
5,901,054 A * 5/1999 Leu ........................ H02M 3/285
327/254

(Continued)

FOREIGN PATENT DOCUMENTS

| JP | 2002-051566 A | 2/2002 |
| JP | 2012-050252 A | 3/2012 |
| JP | 2012-120296 A | 6/2012 |

OTHER PUBLICATIONS

Communication dated Feb. 21, 2017 issued by the Japanese Patent Office in corresponding application No. 2016-061240.

*Primary Examiner* — Bentsu Ro
(74) *Attorney, Agent, or Firm* — Sughrue Mion, PLLC; Richard C. Turner (57) ABSTRACT

An inverter control device that controls a multiple of inverters configured to use the same positive and negative direct current voltage bus lines connected to a power supply and driving a corresponding multiple of motors, the inverter control device including smoothing control means that controls an inverter outflow current so that voltage of the power supply is smoothed by a smoothing capacitor connected to the positive and negative direct current voltage bus lines, and two-phase modulation operation means that fixes a predetermined one phase of a three-phase modulated wave at either a maximum voltage or minimum voltage the inverter can output determined by a voltage between the positive and negative direct current voltage bus lines, and calculates a modulated wave that causes the other two phases to switch.

9 Claims, 7 Drawing Sheets

(51) Int. Cl.
*H02P 27/08* (2006.01)
*H02P 5/00* (2016.01)

(56) References Cited

U.S. PATENT DOCUMENTS

| | | | | |
|---|---|---|---|---|
| 5,998,880 | A * | 12/1999 | Kumar | B60L 11/08 290/40 A |
| 7,227,273 | B2 * | 6/2007 | Ahmad | B60K 6/46 290/40 C |
| 7,466,086 | B2 * | 12/2008 | Kiuchi | H02P 5/74 318/400.07 |
| 7,609,024 | B2 * | 10/2009 | Ahmad | H02P 29/40 180/165 |
| 2012/0049782 | A1 | 3/2012 | Suzuki | |

* cited by examiner

INVERTER CONTROL DEVICE AND INVERTER CONTROL METHOD

BACKGROUND OF THE INVENTION

Field of the Invention

The present invention relates to an inverter control device and inverter control method, and in particular, relates to an inverter control device that controls a multiple of inverters configured to use the same positive and negative direct current voltage bus lines connected to a power supply and driving a corresponding multiple of motors, and to an inverter control method.

Description of the Related Art

For example, efficiency when driving a motor is extremely important in an application such as a hybrid automobile or electric automobile. Therefore, two-phase modulation is often used as a method of improving efficiency when driving a motor using pulse width modulation (PWM). Two-phase modulation is such that switching of a predetermined one phase of three phases is stopped, because of which switching loss occurring in a switching element can be reduced. Meanwhile, however, two-phase modulation is such that current pulse is large because there are few switchings, because of which there is a problem in that ripple of direct current bus line voltage increases.

This problem is particularly noticeable when a multiple of motors are driven using the same positive and negative direct current voltage bus lines, and increasing the size of a smoothing capacitor is unavoidable, which leads to an increase in cost.

To date, as a control method whereby direct current voltage is smoothed, a method whereby inverter outflow current pulses are displaced, or a method whereby inverter outflow current pulses are neutralized, when driving a multiple of motors using PWM by appropriately displacing phases of carrier waves with respect to the multiple of motors in accordance with motor drive states has been proposed, as disclosed in, for example, Patent Document 1.
Patent Document 1: JP-A-2002-51566

However, the heretofore described control method is such that a separate carrier wave is used for each motor, because of which there is a problem in that an operation load increases. Also, the heretofore described means that does not use two-phase modulation is such that switching loss cannot be reduced, and there is a problem in that an increase in efficiency cannot be expected.

SUMMARY OF THE INVENTION

The invention, having been contrived in consideration of these kinds of problem, has an object of providing an inverter control device and inverter control method such that, when a multiple of motors are driven using the same positive and negative direct current voltage bus lines, inverter switching loss is reduced and an in efficiency achieved with a simple configuration, and a ripple current of chargeable and dischargeable storage means is reduced by an effective value of inverter output current being reduced, whereby the storage means can be reduced in size.

An inverter control device according to the invention is an inverter control device that controls a multiple of inverters configured to use the same positive and negative direct current voltage bus lines connected to a power supply and driving a corresponding multiple of motors, the inverter control device being characterized by including a smoothing control unit that controls an inverter outflow current so that voltage of the power supply is smoothed by a chargeable and dischargeable capacitor connected to the positive and negative direct current voltage bus lines, and a modulated wave level regulating unit that regulates levels of a three-phase modulated wave.

Also, an inverter control method according to the invention is an inverter control method such that a power supply and a chargeable and dischargeable capacitor are connected to positive and negative direct current voltage bus lines, and a multiple of inverters that drive a corresponding multiple of motors are connected to the positive and negative direct current voltage bus lines, whereby the multiple of inverters are controlled, the inverter control method being characterized by controlling an inverter outflow current so that voltage of the power supply is smoothed, and by regulating a phase of the inverter outflow current.

According to the inverter control device and inverter control method according to the invention, smoothing of a power supply voltage, that is, smoothing of a voltage between positive and negative direct current voltage bus lines connected to a power supply, can be achieved by regulating phases of inverter outflow currents corresponding to a multiple of motors. As a result of this, there is an advantage in that a ripple current of chargeable and dischargeable storage means is reduced by an effective value of inverter output current being reduced, whereby the storage means can be reduced in size. Also, there is an advantage in that switching loss occurring in an inverter switching element is reduced.

The foregoing and other objects, features, aspects and advantages of the invention will become more apparent from the following detailed description of the invention when taken in conjunction with the accompanying drawings.

DETAILED DESCRIPTION OF THE PREFERRED EMBODIMENTS

Hereafter, referring to the drawings, a detailed description will be given of a preferred embodiment of an inverter control device and inverter control method according to the invention. In addition to a multi-phase alternating current motor being included, a direct current motor is also included in motors described hereafter. Also, "inverter" refers to an inverter used in the normal sense when a motor is a multi-phase alternating current motor, and refers to a chopper when a motor is a direct current motor. The meaning of inverters described hereafter is the same unless otherwise stated.

First Embodiment

Figure 1:
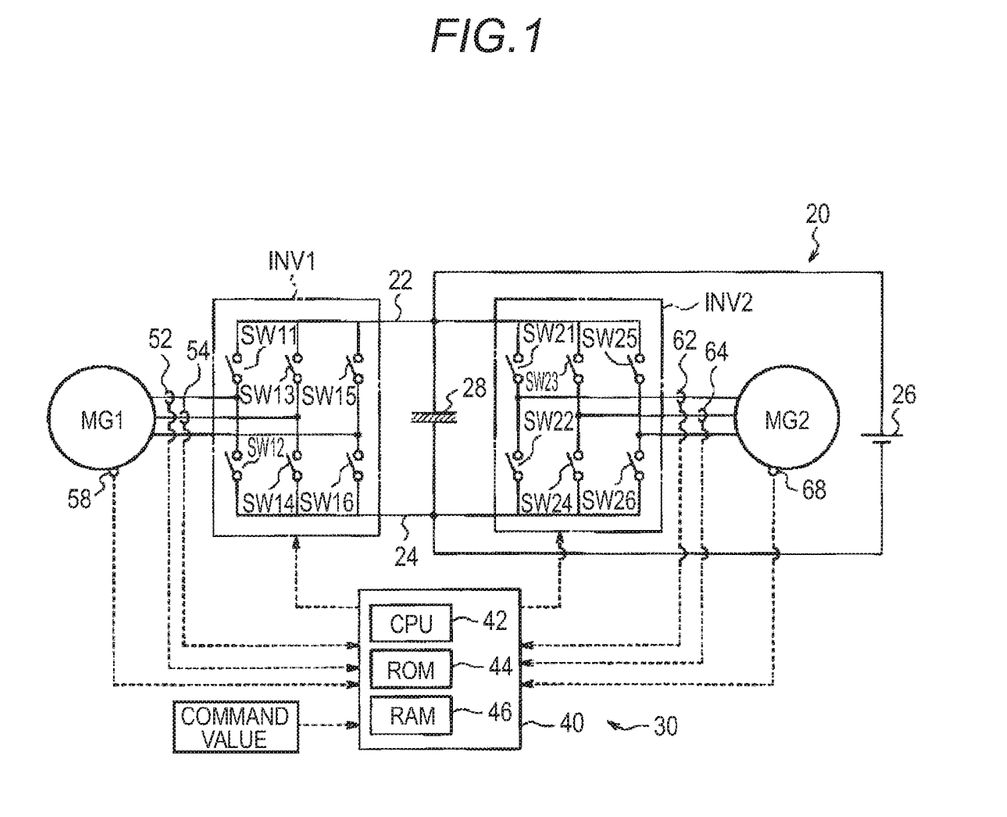
FIG. 1 is a schematic configuration diagram showing a power output device including an inverter control device according to a first embodiment of the invention.

FIG. 1 is a schematic configuration diagram showing a power output device including an inverter control device according to a first embodiment of the invention.

In FIG. 1, a power output device 20, as shown in the diagram, includes a motor MG1 rotationally driven accordance with a three-phase alternating current, an inverter circuit INV1 that converts direct current power into three-phase alternating current power and can supply the three-phase alternating current power to the motor MG1, a motor MG2 rotationally driven in accordance with a three-phase alternating current, an inverter circuit INV2 that converts direct current power into three-phase alternating current power and can supply the three-phase alternating current power to the motor MG2, a direct current power supply 26 connected to a positive electrode bus line 22 and negative electrode bus line 24 of the inverter circuit INV1 and inverter circuit INV2, chargeable and dischargeable storage means, a smoothing capacitor 28 for example, connected to the positive electrode bus line 22 and negative electrode bus line 24 of the inverter circuit INV1 and inverter circuit INV2, and an inverter control device 30 that controls the inverter circuit INV1 and inverter circuit INV2.

The motors MG1 and MG2 are both configured as synchronous generator motors capable of generating power, configured of, for example, a rotor to an outer surface of which a permanent magnet is attached and a stator in which a three-phase coil is wound. A shaft of the motor MG1 forms an output shaft of the power output device 20, and power is output from the shaft. A shaft of the motor MG2 is indirectly connected to the output shaft of the power output device 20, and power from the motor MG2 can also be indirectly output to the output shaft of the power output device 20. As the motors MG1 and MG2 are configured as synchronous generator motors in this embodiment, power can be generated by the motors MG1 and MG2 provided that power is input to the shafts of the motors MG1 and MG2.

The inverter circuits INV1 and INV2 are each configured of six switching elements, SW11 to SW16 and SW21 to SW26 respectively. The six switching elements SW11 to SW16 and six switching elements SW21 to SW26 are disposed in pairs so as to form a source side and sink side with respect to the positive electrode bus line 22 and negative electrode bus line 24, and the three-phase coil (UVW) of each of the motors MG1 and MG2 is connected to a connection point of each pair. Consequently, by controlling the ratio of times for which the pair-forming switching elements SW11 to SW16 and SW21 to SW26 are turned on, a rotating field is formed by the three-phase coils of the motors MG1 and MG2, and the motors MG1 and MG2 can be rotationally driven. Switching control of the switching elements SW11 to SW16 of the inverter circuit INV1 and switching control of the switching elements SW21 to SW26 of the inverter circuit INV2 can be carried out independently, because of which drive of the motors MG1 and MG2 can be controlled independently.

The inverter control device 30 includes an electronic control unit 40 configured as a microprocessor centered on a CPU 42. In addition to the CPU 42, the electronic control unit 40 includes a ROM 44 in which a processing program is stored, a RAM 46 in which data are temporarily stored, and an input/output port (not shown), wherein currents Iu and Iv from current sensors 52, 54, 62, and 64 attached to the U-phases and V-phases of the three-phase coils of the motors MG1 and MG2, rotation angles of the rotors of the motors MG1 and MG2 from rotation angle sensors 58 and 68 attached to the shafts of the motors MG1 and MG2 respectively, and the like, are input into the input port, and switching control signals for the switching elements SW11 to SW16 and SW21 to SW26 are output from the output port to the inverter circuit INV1 and inverter circuit INV2.

Next, a description will be given of an operation of the power output device 20 that includes the inverter control device 30 configured as previously described, and in particular of a control method of the inverter control device 30.

Figure 2:
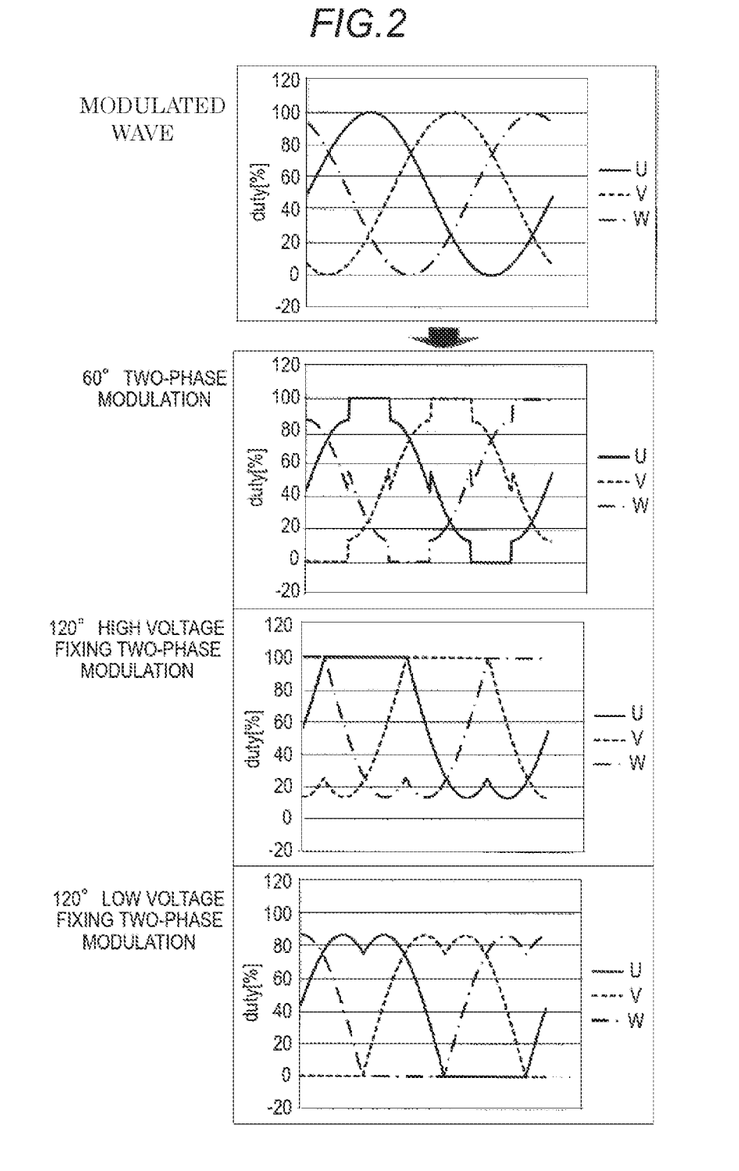
FIG. 2 is a diagram showing a modulated wave with each two-phase modulation method executed by the inverter control device according to the first embodiment of the invention.

FIG. 2 is a diagram illustrating two-phase modulation in PWM control executed by the inverter control device 30. Two-phase modulation is a modulation method whereby, with respect to waves modulated with respect to the U-phase, V-phase, and W-phase of the three-phase coil, a predetermined one phase of the U-phase, V-phase, and W-phase is fixed at either a maximum voltage or minimum voltage the inverter can output determined by a voltage between the positive electrode bus line 22 and negative electrode bus line 24 for every 60° or 120° of the modulated wave phase, and the other two phases are caused to switch. Two-phase modulation operation means that implements operation of three two-phase modulation methods—those being a method that alternately fixes each phase at the maximum value and minimum value every 60° (60° two-phase modulation), a method that fixes each phase at the maximum value every 120° (120° high voltage fixing two-phase modulation), and a method that fixes each phase at the minimum value every 120° (120° low voltage fixing two-phase modulation) is stored in the ROM 44.

Figure 3:
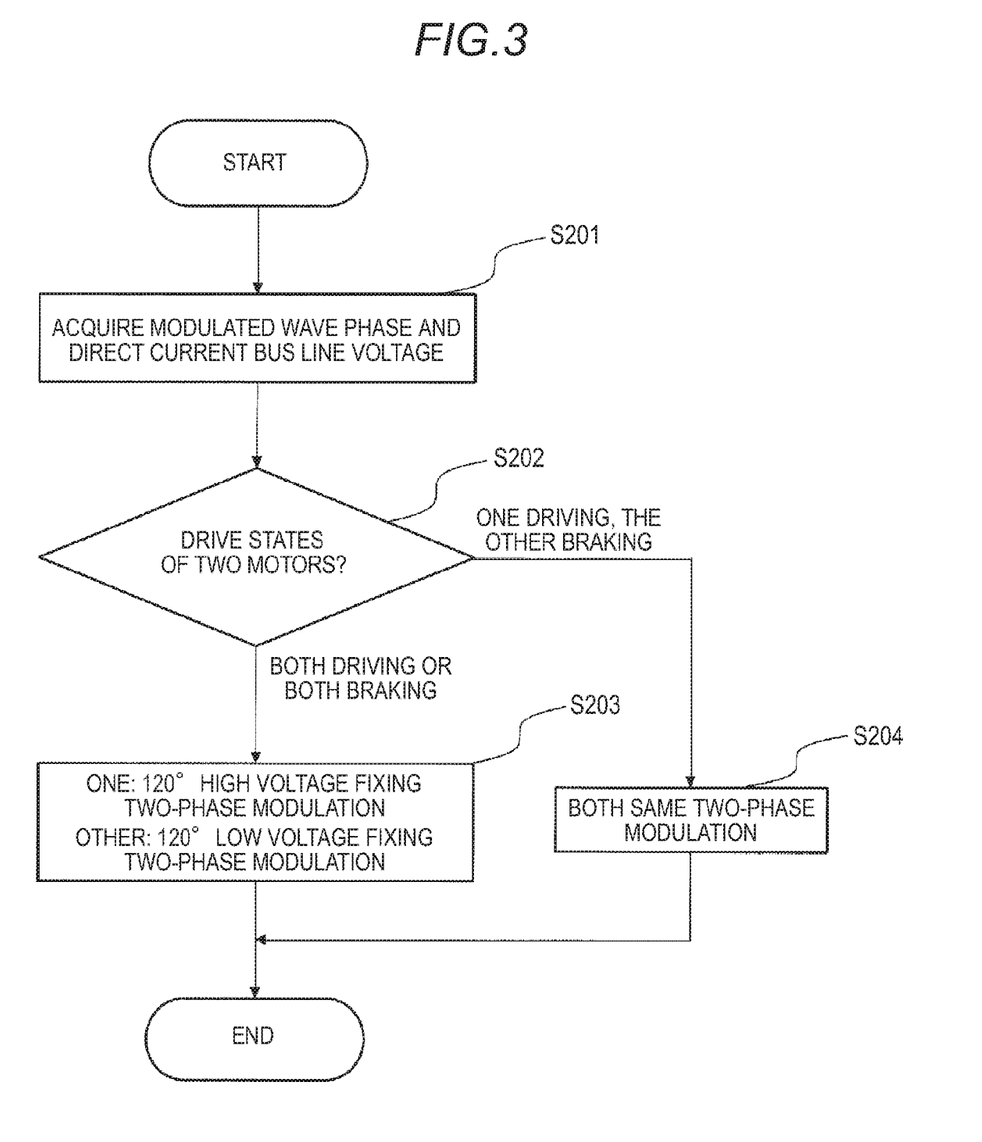
FIG. 3 is a flowchart showing an example of a smoothing control routine executed by the inverter control device according to the first embodiment of the invention.

FIG. 3 is a flowchart showing an example of a smoothing control routine executed by the inverter control device 30. The smoothing control routine is repeatedly executed at every predetermined time interval by smoothing control means stored in the two-phase modulation operation means. Hereafter, the smoothing control routine will be described. The smoothing control means and two-phase modulation operation means may be stored separately in the ROM 44, or the two-phase modulation operation means may be included in the smoothing control means.

When the smoothing control routine is executed, the CPU 42 of the electronic control unit 40 firstly acquires the modulated wave phase and the voltage between the positive electrode bus line 22 and negative electrode bus line 24 (step S201).

Next, a process of determining the drive states of the motors MG1 and MG2 is executed (step S202). Herein, as drive states of the motors MG1 and MG2, there is a driving wherein power is output from the motors MG1 and MG2, and a braking wherein a braking force is output in the motors MG1 and MG2. The drive states of the motors MG1 and MG2 can be determined from the orientation of each phase current of the motors MG1 and MG2, that is, from the orientation of the inverter outflow current with respect to the motors MG1 and MG2, or can be determined from commands to the motors MG1 and MG2.

Next, when the drive states of the motors MG1 and MG2 are both driving or both braking, a high voltage fixing two-phase modulation is carried out with respect to the modulated waves of one of the motor MG1 or motor MG2, and a low voltage fixing two-phase modulation is carried out with respect to the modulated waves of the other motor (step S203).

Also, when the drive state of one of the motors MG1 and MG2 is a driving while the other is a braking, a high voltage fixing two-phase modulation or low voltage fixing two-phase modulation is carried out with respect to the modulated waves of both the motors MG1 and MG2 (step S204).

Figure 4:
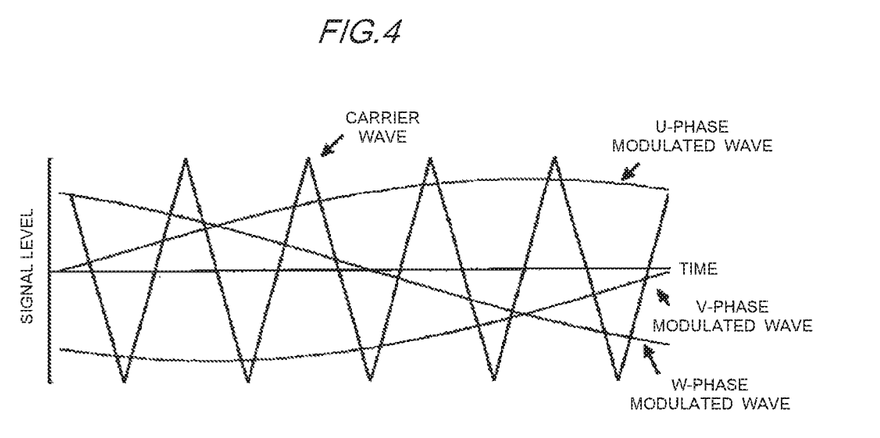
FIG. 4 is an illustration illustrating a method of determining a switching state using a pulse width modulation method when a three-phase alternating current motor is driven using pulse width modulation.

The significance of carrying out the heretofore described smoothing control will be described hereafter. FIG. 4 is an illustration illustrating a method of determining a switching state using a PWM method when a three-phase alternating current motor is driven using PWM.

The modulated waves of the U-phase, V-phase, and W-phase each have a phase of 120 degrees, and are sine waves with an amplitude determined by the value of a command to the motor and a cycle determined from the rotation speed of the motor rotor. The carrier wave is a triangle wave of a frequency higher than that of the modulated waves of each phase used for determining the timings at which the inverter switching elements are turned on and off. Switching of the switching elements of each phase of the inverter is an operation whereby the switching element on the positive electrode bus line side is turned on and the switching element on the negative electrode bus line side turned off when the carrier wave is smaller than the modulated wave, and the switching element on the positive electrode bus line side is turned off and the switching element on the negative electrode bus line side turned on when the carrier wave is greater than the modulated wave.

This operation is such that when all the modulated waves are greater than the carrier wave, the switching elements on the positive electrode bus line side in each phase of the inverter are all turned on, and the motor is in a short-circuited state, because of which the motor is in a state equivalent to being cut off from the power supply and smoothing capacitor, and no current flows between the two. When all the modulated waves are smaller than the carrier wave, the switching elements on she negative electrode bus line side in each phase of the inverter are all turned on, and the motor is in a short-circuited state, because of which, in this case too, the motor is in a state equivalent to being cut off from the power supply and smoothing capacitor, and no current flows between the two. In this way, motor drive using PWM control is such that a state wherein all the modulated waves are greater, and conversely a state wherein all the modulated waves are smaller, than the carrier wave occurs, because of which an inverter outflow current In becomes an intermittent pulse current.

The smoothing capacitor 28 is disposed in close contact with the inverter circuits INV1 and INV2, and high frequency impedance thereof is low. Meanwhile, the direct current power supply 26 is disposed in a position distanced from the inverter circuits INV1 and INV2, low frequency impedance thereof is low, butt high frequency impedance thereof is high. Because of this, an alternating current component of the inverter outflow current In flows into the smoothing capacitor 28, and a direct current component flows into the direct current power supply 26. Consequently, as is at is necessary for the smoothing capacitor 28 to be able to withstand this alternating current, it is necessary to reduce the effective value of the inverter outflow current In in order to reduce the capacity of the smoothing capacitor 28.

Figure 5:
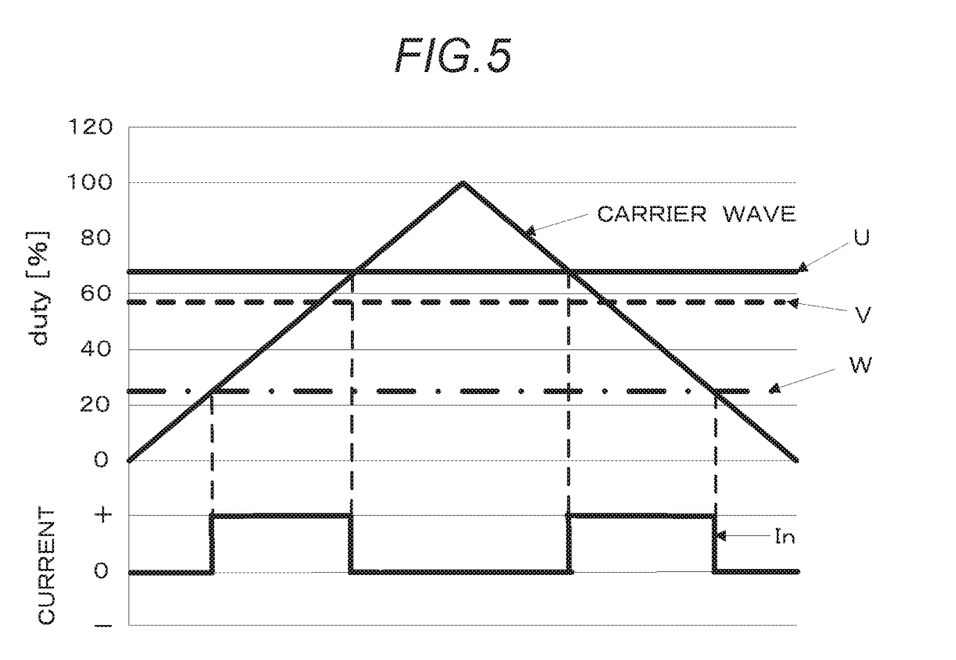
FIG. 5 is an illustration of an inverter outflow current when driving one motor, modeled and shown together with a carrier wave.

FIG. 5 is an illustration of the inverter outflow current In when driving one motor, modeled and shown together with a carrier wave. As shown in the drawing, the inverter outflow current In is generated when the carrier wave is greater than the minimum value, and smaller than the maximum value, of the modulated waves. Herein, considering a case wherein two motors are driven, it is sufficient that the modulated waves of the two motors are regulated so that the pulses of the inverter outflow current In shown in FIG. 5 do not overlap.

Figure 6:
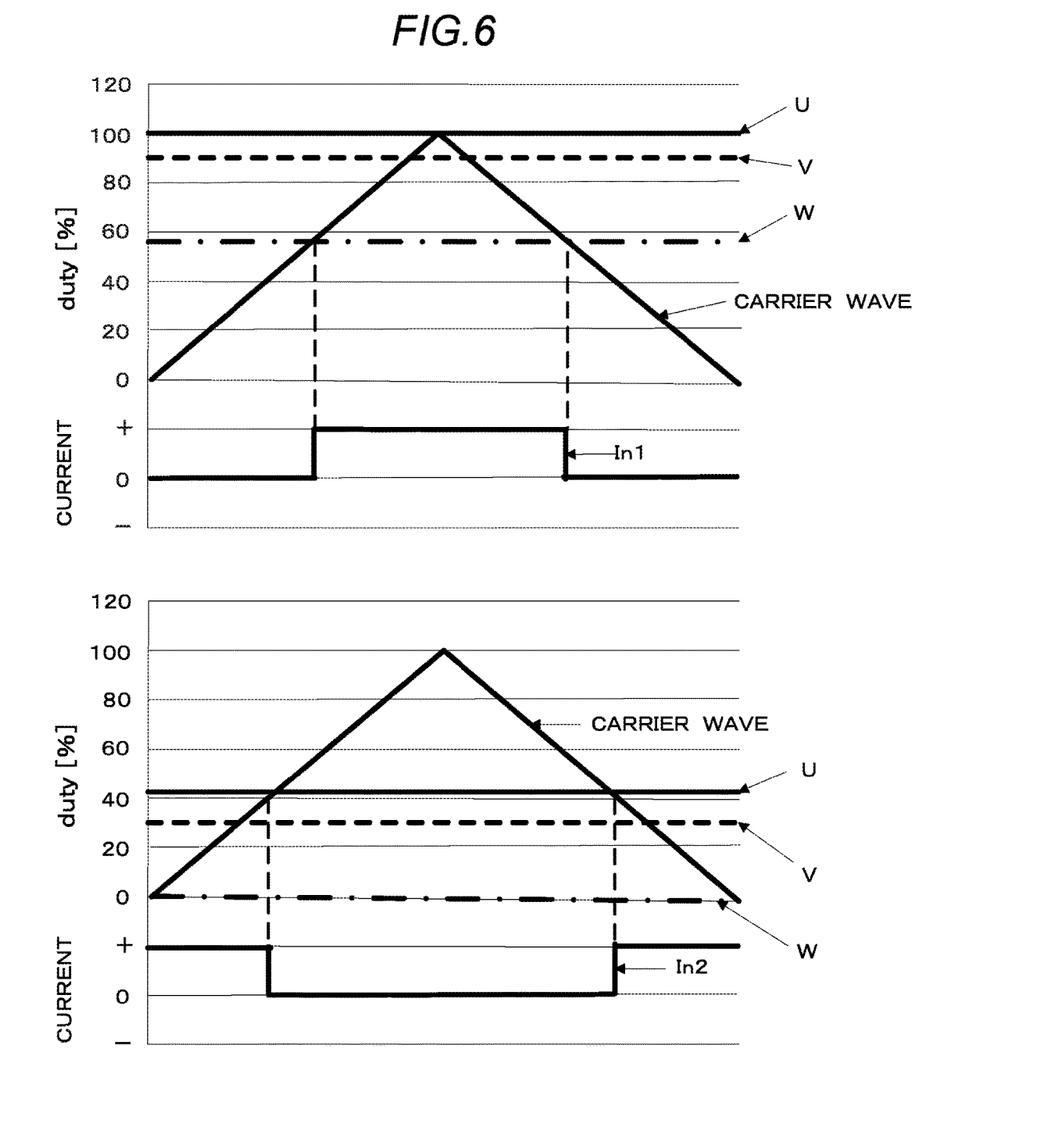
FIG. 6 is an illustration showing inverter outflow currents when driving one motor 120° high voltage fixing two-phase modulation and driving another motor using 120° low voltage fixing two-phase modulation, modeled and shown together with a carrier wave.

FIG. 6 shows inverter outflow currents In1 and In2 when driving one motor using 120° high voltage fixing two-phase modulation and driving another motor using 120° low voltage fixing two-phase modulation, modeled and shown together with a carrier wave. As shown in the drawing, a pulse of the inverter outflow current In1 appears with a peak of the carrier wave as a center, and the inverter outflow current In2 appears with a trough of the carrier wave as a center. When considering a case wherein the same two-phase modulation is carried out for both motors, the inverter outflow current In1 pulse and inverter outflow current In2 pulse appear simultaneously, the inverter outflow current In (In=In1+In2) is such that the inverter outflow current In1 and inverter outflow current In2 overlap, and the effective value thereof increases.

Meanwhile, when driving one motor using 120° high voltage fixing two-phase modulation and driving another motor using 120° low voltage fixing two-phase modulation, as in the example shown in FIG. 6, the inverter outflow current In1 pulse and inverter outflow current In2 pulse appear alternately and evenly, because of which the inverter outflow current In is of a waveform wherein all of the alternately appearing pulses are combined, without overlapping, and the effective value thereof is less than when the carrier wave is in-phase.

When the drive states of the motors MG1 and MG2 are both determined to be driving or braking in step S202 of the smoothing control routine in FIG. 3, one motor is driven using 120° high voltage firing two-phase modulation and the other motor is driven using 120° low voltage fixing two-phase modulation in step S203 in order that the inverter outflow current In1 pulse and inverter outflow current In2 pulse appear alternately and evenly, as shown in FIG. 6, whereby the effective value of the inverter outflow current In is reduced.

Heretofore, using FIG. 6, consideration has been given to a case wherein the drive states of the motors MG1 and MG2 are both driving or both braking, but a case wherein one motor is in a driving state and the other in a braking state will be considered. In this case, the orientations of the inverter outflow current In1 and inverter outflow current In2 differ, and it is sufficient to drive in a state such that the inverter outflow current In1 pulse and inverter outflow current In2 pulse neutralize each other, that is, such that both motors are driven using the same two-phase modulation method.

Figure 7:
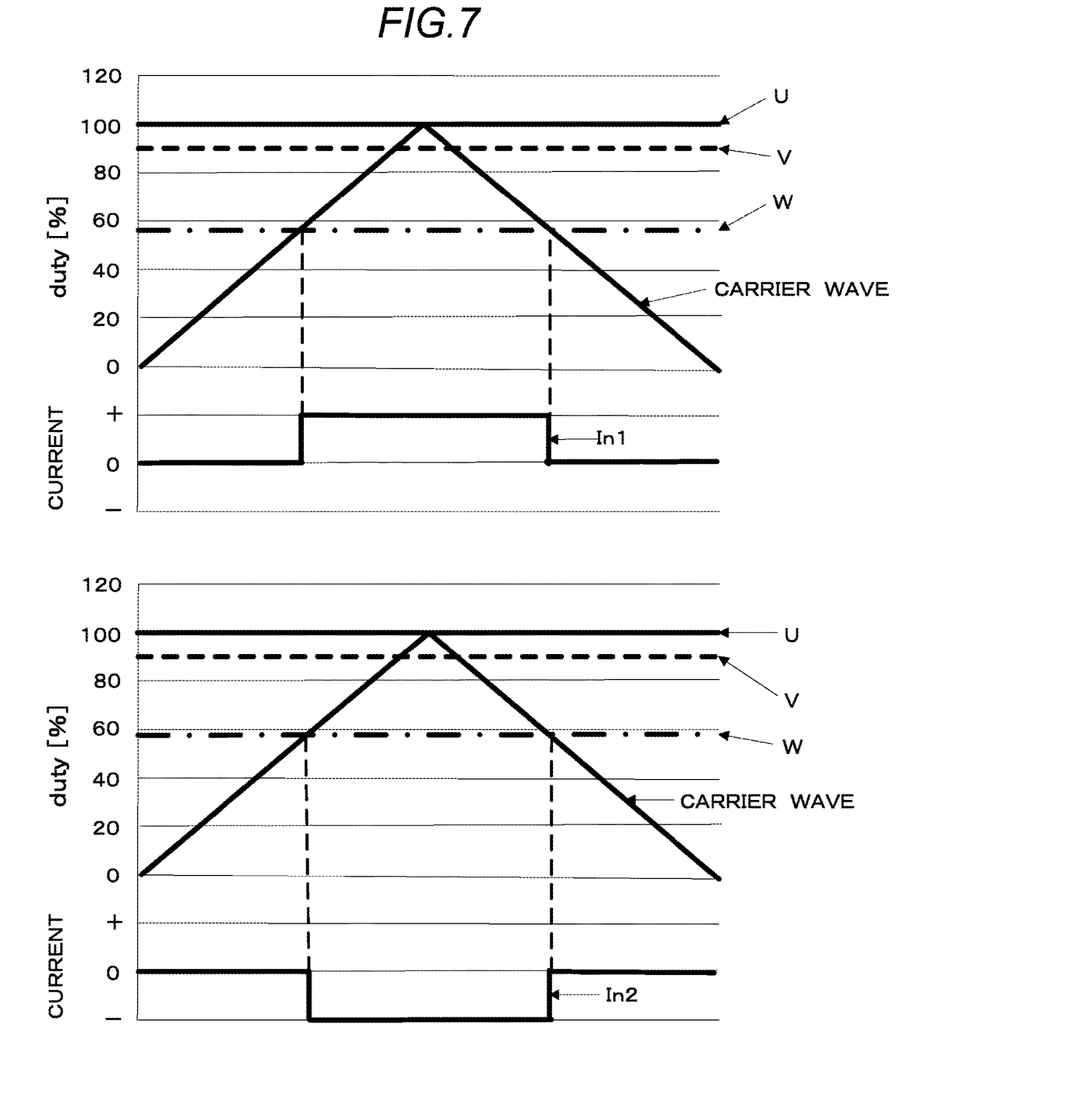
FIG. 7 is an illustration showing the inverter outflow currents when driving two motors using the same two-phase modulation method, modeled and shown together with a carrier wave.

FIG. 7 shows the inverter outflow currents In1 and In2 when controlling to a drive state wherein the motor MG1 is in a braking state and the motor MG2 in a driving state using the same two-phase modulation method, modeled and shown together with a carrier wave. As shown in the drawing, the orientation of the inverter outflow current In2 pulse is the reverse of that of the inverter outflow current In1 pulse, because of which the value of the inverter outflow current In, which is the sum of the inverter outflow In1 and In2, is the result of a neutralization, and the effective value thereof is smaller than when the inverter outflow current In1 pulse and inverter outflow current In2 pulse appear separately.

When the drive states of the motors MG1 and MG2 are determined to be such that one is a driving and the other is a braking in step S202 of the smoothing control routine in FIG. 3, both are driven using the same two-phase modulation in step S204 in order that the inverter outflow current In1 pulse and inverter outflow current In2 pulse appear so as to neutralize each other, as shown in FIG. 7, whereby the effective value of the inverter outflow current In is reduced.

In FIG. 7, a case of a high voltage fixing using 60° two-phase modulation or 120° high voltage fixing two-phase modulation is illustrated, but the same applies in a case of a low voltage fixing using 60° two-phase modulation or 120° low voltage fixing two-phase modulation.

Also, regarding the terminology in FIGS. 2, 5, and 7, duty being 100% corresponds to a high voltage fixing state, and duty being 0% corresponds to a low voltage fixing state.

According to the inverter control device 30 and inverter control method according to the first embodiment, as heretofore described, an appropriate two-phase modulation method is selected based on the drive states of the motors MG1 and MG2, whereby the effective value of the inverter outflow current In can be reduced. As a result of this, the capacity of the smoothing capacitor 28 can be reduced, whereby the manufacturing cost of the power output device 20 can be kept low.

Also, by the smoothing control means controlling the inverter outflow currents so that the power supply voltage is smoothed, the voltage between the positive electrode bus line 22 and negative electrode bus line 24 connected to the direct current power supply 26 can be smoothed. As a result of this, the capacity of the smoothing capacitor 28 connected to the positive electrode bus line 22 and negative electrode bus line 24 can be reduced.

Also, by the smoothing control means regulating the phases of the inverter outflow currents corresponding to the multiple of motors MG1 and MG2, smoothing of the voltage between the positive electrode bus line 22 and negative electrode bus line 24 is carried out. That is, as the pulse of the voltage between the positive electrode bus line 22 and negative electrode bus line 24 is based on the inverter outflow currents corresponding to the multiple of motors MG1 and MG2, the voltage between the positive electrode bus line 22 and negative electrode bus line 24 can be smoothed by regulating the phases of the inverter outflow currents.

Also, an aspect of the smoothing control means regulating the inverter outflow current phases can also be such that the smoothing control means is means that regulates the phases of the inverter outflow currents corresponding to the multiple of motors MG1 and MG2 based on the directions of the inverter outflow currents corresponding to the multiple of motors MG1 and MG2.

An aspect of the smoothing control means regulating the phases based on the directions of the inverter outflow currents can also be such that the smoothing control means is means that regulates the phases of the inverter outflow currents corresponding to the multiple of motors MG1 and MG2 so that the inverter outflow currents are equalized when the inverter outflow currents corresponding to the multiple of motors MG1 and MG2 flow in the same direction.

Also, an aspect of the smoothing control means regulating the phases based on the directions of the inverter outflow currents can also be such that the smoothing control means is means that regulates the phases of the inverter outflow currents corresponding to the multiple of motors MG1 and MG2 so that the inverter outflow currents corresponding to the multiple of motors MG1 and MG2 are neutralized when the inverter outflow currents corresponding to the multiple of motors MG1 and MG2 flow in different directions.

The power output device 20 according to the embodiment is such that the shafts of the motors MG1 and MG2 are configured to be indirectly connected, but the shafts of the motors MG1 and MG2 may also be configured to be directly connected.

Also, the power output device 20 according to the embodiment is such that the motors MG1 and MG2 are configured as synchronous generator motors but, not being limited to synchronous generator motors, the motors MG1 and MG2 may be any type of motor driven by PWM control using an inverter. Also, the power output device 20 according to the embodiment is such that the motors MG1 and MG2 are configured as three-phase alternating current motors but, not being limited to three-phase alternating current motors, the motors MG1 and MG2 may be configured as any multi-phase alternating current motor of two phases or four or more phases.

Also, the power output device 20 according to the embodiment is such that the motors MG1 and MG2 are configured as three-phase alternating current motors, and the inverter circuits INV1 and INV2, which convert direct current power to three-phase alternating current power and supply the three-phase alternating current power to the motors MG1 and MG2, are used, but the motors MG1 and MG2 may be configured as direct current motors, and the inverter circuits may be chopper circuits that supply direct current power to the motors MG1 and MG2 with a duty ratio in accordance with pulse width.

Also, the power output device 20 according to the embodiment is such that a description has been given of PWM control of the motors MG1 and MG2 in a device wherein the drive or the two motors MG1 and MG2 is controlled by the two inverter circuits INV1 and INV2, hut the invention may also be applied to PWM control of three or more motors in a device wherein the drive of three or more motors is controlled by three or more inverter circuits.

In the embodiment, a description has been given of two-phase modulation in PWM control executed by the inverter control device 30 but, it not being necessary that the inverter outflow current phases are regulated by two-phase modulation, the same advantage can be obtained by using modulated wave level regulating means that can regulate the levels of a three-phase modulated wave.

Heretofore, a description has been given of an inverter control device and inverter control method according to the first embodiment of the invention, but the embodiment can be modified or abbreviated as appropriate without departing from the scope of the invention.

What is claimed is:

1. An inverter control device that controls a plurality of inverters configured to use the same positive and negative direct current voltage bus lines connected to a power supply, the plurality of inverters driving a plurality of motors, respectively, the inverter control device comprising:
   a smoothing control unit that controls inverter outflow currents of the plurality of inverters, so that voltage of the power supply is smoothed by a chargeable and dischargeable capacitor connected to the positive and negative direct current voltage bus lines; and
   a modulated wave level regulating unit that regulates levels of a three-phase modulated wave,
   wherein the plurality of motors includes two motors, and the smoothing control unit regulates phases of the inverter outflow currents of the plurality of inverters such that the phase of the inverter overflow current corresponding to one of the two motors opposes the phase of the inverter outflow current corresponding to another motor of the two motors when directions of the inverter outflow currents corresponding to the two motors are the same.

2. The inverter control device according to claim 1, wherein the smoothing control unit regulates the phases of the inverter outflow currents by regulating the levels of three-phase modulated waves corresponding to the two motors when switching elements of the plurality of inverters, respectively, based on each of the three-phase phase-modulated waves corresponding to the two motors and based on a carrier wave.

3. The inverter control device according to claim 2, wherein the smoothing control unit regulates the phases of the inverter outflow currents so that the inverter outflow currents are equalized when the directions of the inverter outflow currents corresponding to the two motors are the same, carries out, for the one of the two motors, a two-phase modulation fixing a predetermined one phase of the three-phase modulated wave at a maximum voltage the inverter can output determined by a voltage between the positive and negative direct current voltage bus lines for every 120° phase of the three-phase modulated wave corresponding to the one of the two motors and causing other two phases to switch, and carries out, for the another motor, a two-phase modulation fixing a predetermined one phase of the three-phase modulated wave at a minimum voltage the inverter can output determined by the voltage between the positive and negative direct current voltage bus lines for every 120° phase of the three-phase modulated wave corresponding to the another motor and causing the other two phases to switch.

4. The inverter control device according to claim 2, wherein the smoothing control unit regulates the phases of the inverter outflow currents so that the inverter outflow currents corresponding to the two motors are neutralized when the directions of the inverter outflow currents corresponding to the two motors differ, and carries out a two-phase modulation with respect to the two motors, fixing a predetermined one phase of the three-phase modulated wave at a maximum voltage or minimum voltage the inverter can output determined by a voltage between the positive and negative direct current voltage bus lines for every 60° phase of the three-phase modulated wave corresponding to each motor and causing other two phases to switch.

5. The inverter control device according to claim 2, wherein the smoothing control unit regulates the phases of the inverter outflow currents so that the inverter outflow currents corresponding to the two motors are neutralized when the directions of the inverter outflow currents corresponding to the two motors differ, and carries out a two-phase modulation with respect to the two motors, fixing a predetermined one phase of the three-phase modulated wave at a maximum voltage the inverter can output determined by a voltage between the positive and negative direct current voltage bus lines for every 120° phase of the three-phase modulated wave corresponding to each motor and causing other two phases to switch.

6. The inverter control device according to claim 2, wherein the smoothing control unit regulates the phases of the inverter outflow currents so that the inverter outflow currents corresponding to the two motors are neutralized when the directions of the inverter outflow currents corresponding to the two motors differ, and carries out a two-phase modulation with respect to the two motors, fixing a predetermined one phase of the three-phase modulated wave at a minimum voltage the inverter can output determined by a voltage between the positive and negative direct current voltage bus lines for every 120° phase of the three-phase modulated wave corresponding to each motor and causing other two phases to switch.

7. The inverter control device according to claim 1, wherein the smoothing control unit regulates the phases of the inverter outflow currents so that the inverter outflow currents corresponding to the two motors are neutralized when the directions of the inverter outflow currents corresponding to the two motors differ.

8. The inverter control device according to claim 1, wherein the modulated wave level regulating unit provides the three-phase modulated wave to the one of the two motors of a higher voltage than that provided to the another motor.

9. An inverter control method such that a power supply and a chargeable and dischargeable capacitor are connected to positive and negative direct current voltage bus lines, and a plurality of inverters that drive two motors are connected to the positive and negative direct current voltage bus lines, the inverter control method comprising:

controlling inverter outflow currents of the plurality of inverters so that voltage of the power supply is smoothed; and regulating phases of the inverter outflow currents of the plurality of inverters such that the phase of the inverter overflow current corresponding to one of the two motors opposes the phase of the inverter outflow current corresponding to another motor of the two motors when directions of the inverter outflow currents corresponding to the two motors are the same.

* * * * *